US012639636B2

(12) United States Patent　　　　(10) Patent No.:　US 12,639,636 B2

Phan et al.　　　　　　　　　　　　(45) Date of Patent:　　　May 26, 2026

(54) INTEGRATED MACHINE LEARNING PREDICTION AND OPTIMIZATION FOR DECISION-MAKING

(71) Applicant: INTERNATIONAL BUSINESS MACHINES CORPORATION, Armonk, NY (US)

(72) Inventors: Dzung Tien Phan, Pleasantville, NY (US); Long Vu, Chappaqua, NY (US); Lam Minh Nguyen, Ossining, NY (US); Dharmashankar Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 17/708,834

(22) Filed: Mar. 30, 2022

(65) Prior Publication Data

US 2023/0316150 A1　　Oct. 5, 2023

(51) Int. Cl.
G06F 18/20　　　　(2023.01)
G06N 20/20　　　　(2019.01)

(52) U.S. Cl.
CPC ........... G06N 20/20 (2019.01); G06F 18/285 (2023.01)

(58) Field of Classification Search
CPC ...... G06N 20/20; G06N 3/0985; G06N 20/00; G06F 18/285; G06V 10/776; G06K 9/62
See application file for complete search history.

(56) References Cited

U.S. PATENT DOCUMENTS

| | | | |
|---|---|---|---|
| 2014/0365053 A1* | 12/2014 | Pita-Gil | B60L 7/26 |
| | | | 701/22 |
| 2020/0074325 A1 | 3/2020 | Lo et al. | |
| 2020/0184382 A1 | 6/2020 | Fishkov et al. | |
| 2021/0019652 A1 | 1/2021 | Gadelrab et al. | |
| 2022/0283878 A1* | 9/2022 | Cao | G06F 9/4881 |

(Continued)

FOREIGN PATENT DOCUMENTS

| | | |
|---|---|---|
| CN | 109523139 | 3/2019 |
| KR | 20200017604 | 2/2020 |
| KR | 10-2194002 B1 | 12/2020 |

OTHER PUBLICATIONS

Wu J, Frazier P. Practical two-step lookahead Bayesian optimization. Advances in neural information processing systems. 2019;32. (Year: 2019).*

(Continued)

*Primary Examiner* — K C Chen
*Assistant Examiner* — Kuang F Chen
(74) *Attorney, Agent, or Firm* — Seed Intellectual Property Law Group LLP

(57) ABSTRACT

A method includes training, by one or more processing devices, a plurality of machine learning predictive models, thereby generating a plurality of trained machine learning predictive models. The method further includes generating, by the one or more processing devices, a solved machine learning optimization model, based at least in part on the plurality of trained machine learning predictive models. The method further includes outputting, by the one or more processing devices, one or more control input and predicted outputs based at least in part on the solved machine learning optimization model.

20 Claims, 8 Drawing Sheets

(56) References Cited

U.S. PATENT DOCUMENTS

| | | | |
|---|---|---|---|
| 2023/0097533 A1* | 3/2023 | Reynolds ............. | G06N 3/0464 |
| | | | 700/86 |
| 2023/0297060 A1* | 9/2023 | Reynolds ............. | G05B 19/056 |
| | | | 700/46 |

OTHER PUBLICATIONS

Mell et al., "The NIST Definition of Cloud Computing", NIST, Special Publication 800-145, Sep. 2011, 7 pages.
Chai et al., "An integrated closed-loop solution to assisted history matching and field optimization with machine learning techniques", Journal of Petroleum Science And Engineering, 2021, vol. 198, 10 pages.
Subramanian et al., "A Prediction-Optimization Framework for Site-wide Process Optimization", IEEE International Congress on Internet of Things (ICIOT), 2019, 8 pages.
Baker et al., "Workshop Report on Basic Research Needs for Scientific Machine Learning: Core Technologies for Artificial Intelligence", USDOE Office of Science (SC), Washington, DC, 2019, 109 pages.
Phan et al., "Regression Optimization for System-level Production Control", 2021 American Control Conference (ACC), IEEE, May 2021, 6 pages.
Hu et al., "Voronoi-Based Multi-Robot Autonomous Exploration in Unknown Environments via Deep Reinforcement Learning", IEEE Transactions on Vehicular Technology. vol. 69, No. 12, Dec. 2020, 11 pages.
"Big Picture—Data-Driven ML and AL," Phan et al., presented at the Informs conference at Anaheim, California, Oct. 25, 2021, 1 page.

\* cited by examiner

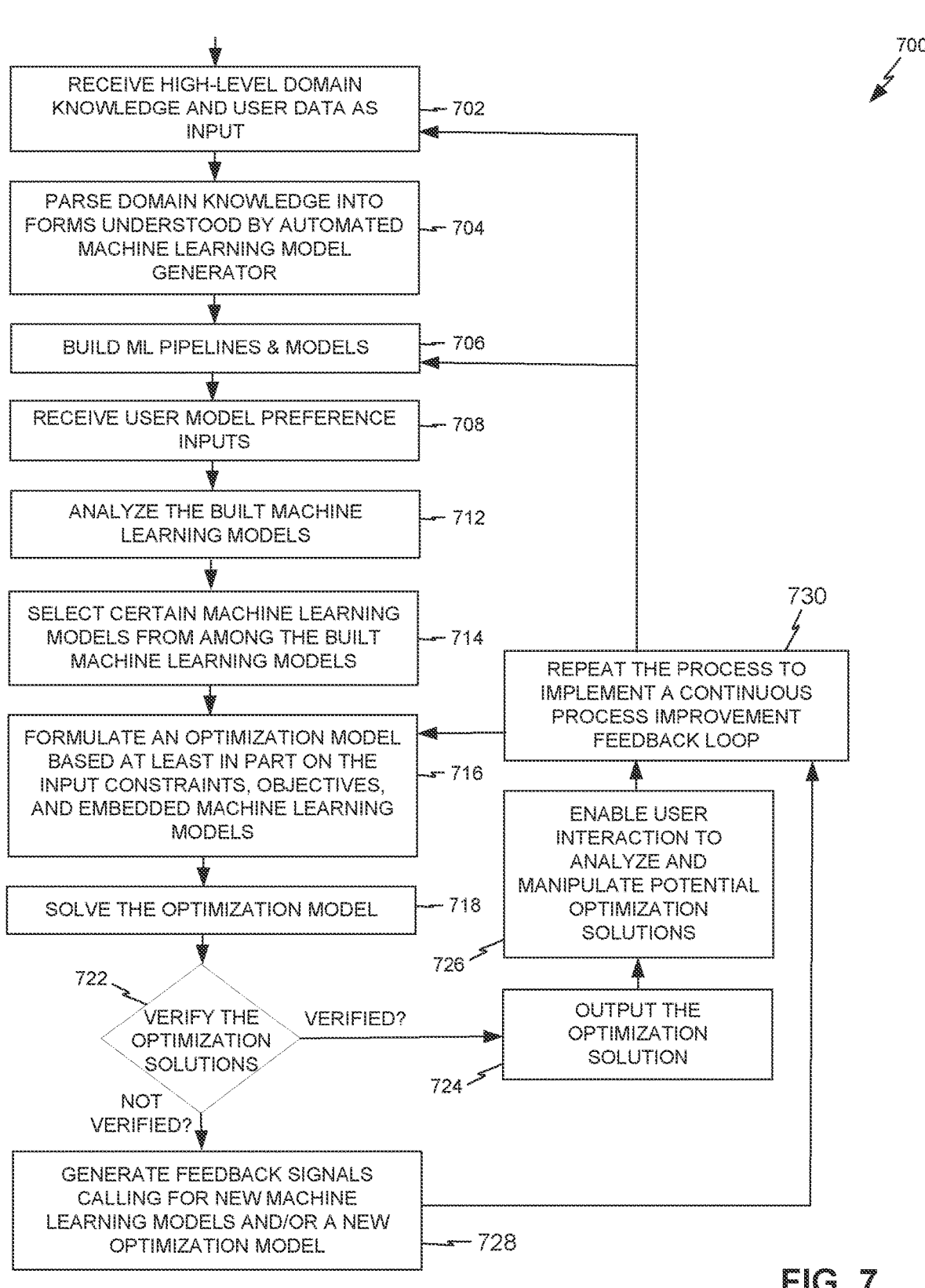

700

RECEIVE HIGH-LEVEL DOMAIN KNOWLEDGE AND USER DATA AS INPUT — 702

PARSE DOMAIN KNOWLEDGE INTO FORMS UNDERSTOOD BY AUTOMATED MACHINE LEARNING MODEL GENERATOR — 704

BUILD ML PIPELINES & MODELS — 706

RECEIVE USER MODEL PREFERENCE INPUTS — 708

ANALYZE THE BUILT MACHINE LEARNING MODELS — 712

SELECT CERTAIN MACHINE LEARNING MODELS FROM AMONG THE BUILT MACHINE LEARNING MODELS — 714

FORMULATE AN OPTIMIZATION MODEL BASED AT LEAST IN PART ON THE INPUT CONSTRAINTS, OBJECTIVES, AND EMBEDDED MACHINE LEARNING MODELS — 716

SOLVE THE OPTIMIZATION MODEL — 718

722 — VERIFY THE OPTIMIZATION SOLUTIONS

VERIFIED?

NOT VERIFIED?

GENERATE FEEDBACK SIGNALS CALLING FOR NEW MACHINE LEARNING MODELS AND/OR A NEW OPTIMIZATION MODEL — 728

730

REPEAT THE PROCESS TO IMPLEMENT A CONTINUOUS PROCESS IMPROVEMENT FEEDBACK LOOP

ENABLE USER INTERACTION TO ANALYZE AND MANIPULATE POTENTIAL OPTIMIZATION SOLUTIONS

726

OUTPUT THE OPTIMIZATION SOLUTION

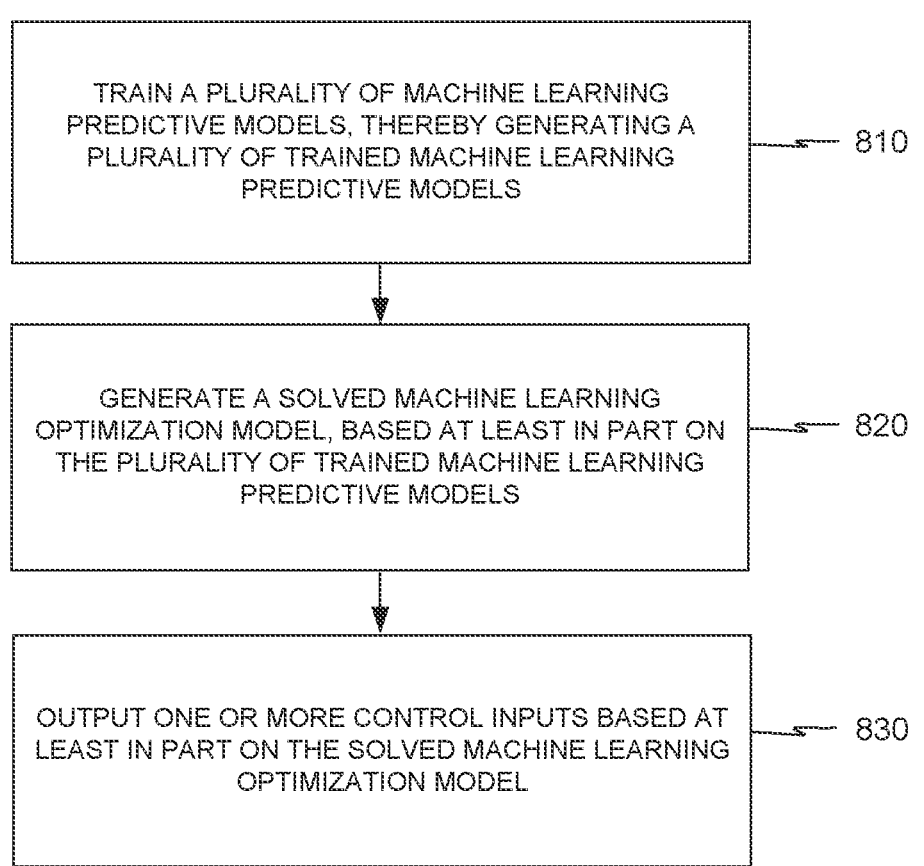

TRAIN A PLURALITY OF MACHINE LEARNING PREDICTIVE MODELS, THEREBY GENERATING A PLURALITY OF TRAINED MACHINE LEARNING PREDICTIVE MODELS — 810

GENERATE A SOLVED MACHINE LEARNING OPTIMIZATION MODEL, BASED AT LEAST IN PART ON THE PLURALITY OF TRAINED MACHINE LEARNING PREDICTIVE MODELS — 820

OUTPUT ONE OR MORE CONTROL INPUTS BASED AT LEAST IN PART ON THE SOLVED MACHINE LEARNING OPTIMIZATION MODEL — 830

FIG. 8

INTEGRATED MACHINE LEARNING PREDICTION AND OPTIMIZATION FOR DECISION-MAKING

BACKGROUND

Aspects of the present disclosure relate generally to machine learning for data-driven decision-making.

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE: "Big Picture—Data-Driven ML and AL," Phan et al. (i.e. the identical inventors of the present disclosure), presented on Oct. 25, 2021 at the Informs conference at Anaheim, California, 1 page; listed in and provided with IDS.

Machine learning models may be trained on data to be used as predictive models. Machine learning models may be shaped by model architectures, objectives, constraints, data, data hygiene, pre-processing and post-processing, and other factors. Machine learning models may be combined with optimization for decision-making.

SUMMARY

One aspect of the present disclosure is directed to a method that includes training, by one or more processing devices, a plurality of machine learning predictive models, thereby generating a plurality of trained machine learning predictive models. The method further includes generating, by the one or more processing devices, a solved machine learning optimization model, based at least in part on the plurality of trained machine learning predictive models. The method further includes outputting, by the one or more processing devices, one or more control inputs and predicted outputs based at least in part on the solved machine learning optimization model.

Another aspect of the present disclosure is directed to a computer program product including one or more computer readable storage media having program instructions collectively stored on the one or more computer readable storage media. The program instructions are executable to train a plurality of machine learning predictive models, thereby generating a plurality of trained machine learning predictive models. The program instructions are further executable to generate a solved machine learning optimization model, based at least in part on the plurality of trained machine learning predictive models. The program instructions are further executable to output one or more control inputs and predicted outputs based at least in part on the solved machine learning optimization model.

Another aspect of the present disclosure is directed to a system that includes one or more processors, one or more computer-readable memory devices, one or more computer-readable storage media, and program instructions collectively stored on the one or more computer-readable storage media. The program instructions are executable to train a plurality of machine learning predictive models, thereby generating a plurality of trained machine learning predictive models. The program instructions are further executable to generate a solved machine learning optimization model, based at least in part on the plurality of trained machine learning predictive models. The program instructions are further executable to output one or more control inputs and predicted outputs based at least in part on the solved machine learning optimization model.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 7 shows a flowchart of an exemplary method in accordance with aspects of the disclosure.

FIG. 8 shows a flowchart of an exemplary method in accordance with aspects of the disclosure.

DETAILED DESCRIPTION

Figure 1:
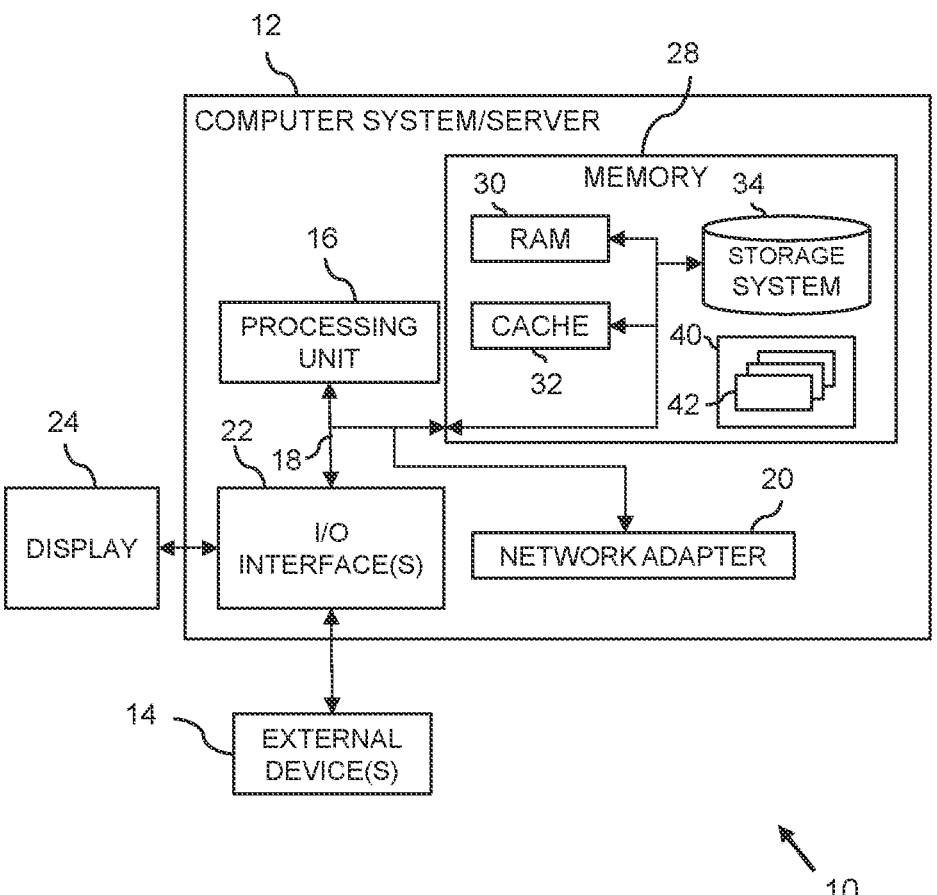
FIG. 1 depicts a cloud computing node according to an embodiment of the present disclosure.

Aspects of the present disclosure relate generally to machine learning and, more particularly, to combining and integrating machine learning and optimization for data-driven decision-making. In various aspects of the present disclosure, machine learning prediction may be intelligently integrated with the separate field of optimization, to provide integration of machine learning predictive models and optimization models, or integrated optimized machine learning for control of physical process systems. In various aspects, this disclosure describes an automated end-to-end prediction-optimization system for optimal control physical systems and other system-wide applications using automated machine learning and optimization with machine learning model selection and feedback on optimization solution quality.

A wide variety of complex physical process systems include various input materials to the system and output materials from the system, and various reservoirs, flows, and forms of combinations of input materials and intermediate materials within the system. The inherent complexity of such a system gives rise to corresponding complexity in how to control such a system to optimize for desired outputs. This may include how to control the combination of input rates of input materials to the system, and process rates of processes within the system, for example. Aspects of this disclosure include systems, methods, and devices for implementing automated, integrated optimized machine learning for controlling such complex physical systems in novel ways to achieve novel advantages in desired system outputs and outcomes. Aspects of this disclosure include novel ways of combining and integrating the separate fields of machine learning and optimization, and iterative improvement feedback loops between machine learning and optimization, to achieve novel advantages in desired system outputs and outcomes, such as maximized output rates of desired physical outputs given the constraints of the physical inputs and the system, in some examples.

In various aspects, this disclosure provides systems, methods, and devices for an automated end-to-end prediction-optimization system for optimal control physical systems and other system-wide applications using automated machine learning and optimization with machine learning (ML) model selection and feedback on optimization solution quality. An example method may include ingesting, by a computing system, data from sensors (e.g., Supervisory Control and Data Acquisition (SCADA), Data Acquisition (DAQ)) and self-learning correlations between key process performance variables and state/control variables. An example method may further include generating, by a computing system, ML models with Automated Machine Learning (AML) systems, such as IBM® AutoAI™ (produced by International Business Machines Corporation). An example method may further include performing, by a computing system, ML model complexity analysis and ML model selection for an optimization problem to form decision optimization (DO) pipelines. An example method may further include embedding, by a computing system, ML models, and constructing optimization models, that compute and/or output optimal operating set-points or other control inputs for the physical system, to implement novel advantages in such control inputs and in optimizing the resulting outputs or other outcomes. An example method may further include providing, by a computing system, a metric for decision solution quality, and incorporating feedback on decision solution quality, to improve ML models and optimization models to be used in iterative improvement of all of the steps above, to generate potentially continuous improvement in computing and/or outputting optimal operating set-points or other control inputs for the physical system, to implement novel advantages in such control inputs and in optimizing the resulting outputs or other outcomes.

In various aspects, this disclosure provides systems, methods, and devices for a closed loop system-wide framework for coordinating interactions between Automated Machine Learning (AML) systems and optimization systems. An example method may include implementing, by a computing system, an ML model selection algorithm using, for example, three metrics or measures: model accuracy, model complexity, and optimization class similarity, and feature importance. An example method may further include implementing, by a computing system, a feedback loop that updates the ML models and/or the optimization models being used, by iteratively incorporating the results of ongoing analysis of the ML models and/or the optimization models being used, which may thereby implement further novel advantages of continuous improvement in the automated, integrated optimized machine learning systems generating control inputs to a target physical system, and predicted outputs from the target physical system in response to the generated control inputs, in various examples.

In various aspects, this disclosure provides systems, methods, and devices for optimization of a physical system using predictive machine learning models. An example method may include obtaining, by a computing system, historical data for a target physical system to be controlled, and performing training of a plurality of machine learning models on the physical system. The machine learning models used and trained on the target physical system may include one or more implementations of any one or more of deep neural networks (DNNs), decision tree (DT) and boosted decision tree (BDT) models, random forest (RF) models, linear regression (LR) models, multivariate adaptive regression splines (MARS), ensemble opaque functions or open-source implementations thereof, and/or any other types of machine learning models or related regression or statistical analysis models. An example method may further include forming or classifying, by the computing system, an ML model complexity, model accuracy, and model type for each of the machine learning models used, and using these classifications in selecting a subset of one or more of the trained machine learning models to process through a prediction optimization pipeline. An example method may further include obtaining, by the computing system, historical data for the physical system to perform training of the expected improvement evaluator, and sending the feedback signal to a machine learning model generator and optimization model generator. An example method may further include evaluating, by the computing system, the solution quality generated by each of the machine learning optimization pipelines, by using the expected improvement evaluator. An example method may further include generating, by the computing system, a machine learning optimization solution (or one or more machine learning optimization solutions), as a result of processing the selected machine learning models through a machine learning optimization pipeline and evaluating the solution quality generated by each of the machine learning optimization pipelines. An example method may further include combining, by the computing system, the machine learning optimization solution with target values from the optimization problem to generate control actions, with which to control the physical system, to generate optimized outputs and outcomes.

In various aspects, an example method may further include forming, by the computing system, machine learning optimization pipelines (DO pipelines) based on ML model complexity, model accuracy, and model type for one or more of the machine learning models being implemented, analyzed, and compared. An example method may further include constructing, by the computing system, an optimization problem using a knowledge graph and operational and/or resource constraints for optimization of the physical system to generate control actions. An example method may further include receiving, by the computing system, one or more user-indicated preference inputs from a user, indicative of desired outputs, desired output characteristics, or other desired outcomes to be optimized, such as in terms of solution quality and/or running time speed, for example, and incorporating the received user-indicated preference inputs as part of the constraints among which to optimize the control actions for optimizing the desired outputs, desired output characteristics, or other desired outcomes to be optimized.

Implementations of the present disclosure provide an improvement in the technical field of optimization by automatically and intelligently combining machine learning and optimization in an iterative self-improving feedback loop of integrated optimized machine learning (ML), with machine learning model selection and feedback on decision solution quality. Typical machine learning systems are separate from and even incompatible with the field of optimization, and typical optimization systems are separate from and even incompatible with machine learning systems. In typical systems, application constraints and knowledge are given in various forms and in separate input files (e.g., separate comma-separated value (CSV) files for ML models and constraints, objectives, etc.). In typical systems, ML models are built by data scientists and saved to pickle files that are then sent to optimization analysts. Optimization analysts typically manually load models, constraints, and objectives from different files and formats into a system, define the flow graph, and may execute an optimization solver, for example CPLEX, to get a solution. Optimization analysts may then typically manually verify the solution, and if needed, relax constraints and ask data scientists to rebuild the ML models for the next optimization round. The process typically repeats. It is typically tedious, error-prone, time-consuming, and expensive. Previous to this disclosure and its contents, no efficient automated methods have existed for ML model selection and ML model complexity evaluation when embedding ML models into optimization models for decision-making. Typical systems do not generate feedback on optimization solution for improving ML models and optimization models.

Aspects of the present disclosure are based on the inventive insight that the separate advantages of machine learning systems and optimization systems may advantageously be leveraged together in a combined system. Aspects of this disclosure include methods, techniques, systems, and devices for effectively combining machine learning and optimization into integrated optimized machine learning systems in various examples. Aspects of this disclosure include implementing and training a variety of machine learning models on the physical system; analyzing the ML model complexity, model accuracy, and model type for each of the machine learning models; analyzing, with an optimization system, the machine learning accuracy, decision solution quality, and speed of solution convergence of each of the machine learning optimization pipelines; and selecting optimized machine learning models to use to generate control actions for the physical system, thereby generating novel advantages in optimizing the desired outputs of the physical system, beyond what is capable with typical machine learning systems or optimization systems, in various examples. Implementations of this disclosure may enable novel advantages in a wide range of applications, including within the fields of industrial manufacturing, commercial logistics and sales, energy processing, Internet-of-Things (IoT) technology and solutions, big data, and analytics, as merely a sample and not an exhaustive listing of fields of applications.

To the extent implementations of the disclosure may collect, store, or employ personal information provided by, or obtained from, individuals (for example, operators of an integrated optimized machine learning system of this disclosure, or customers in a commercial distribution and sales example of a complex physical system being optimized by systems of this disclosure), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
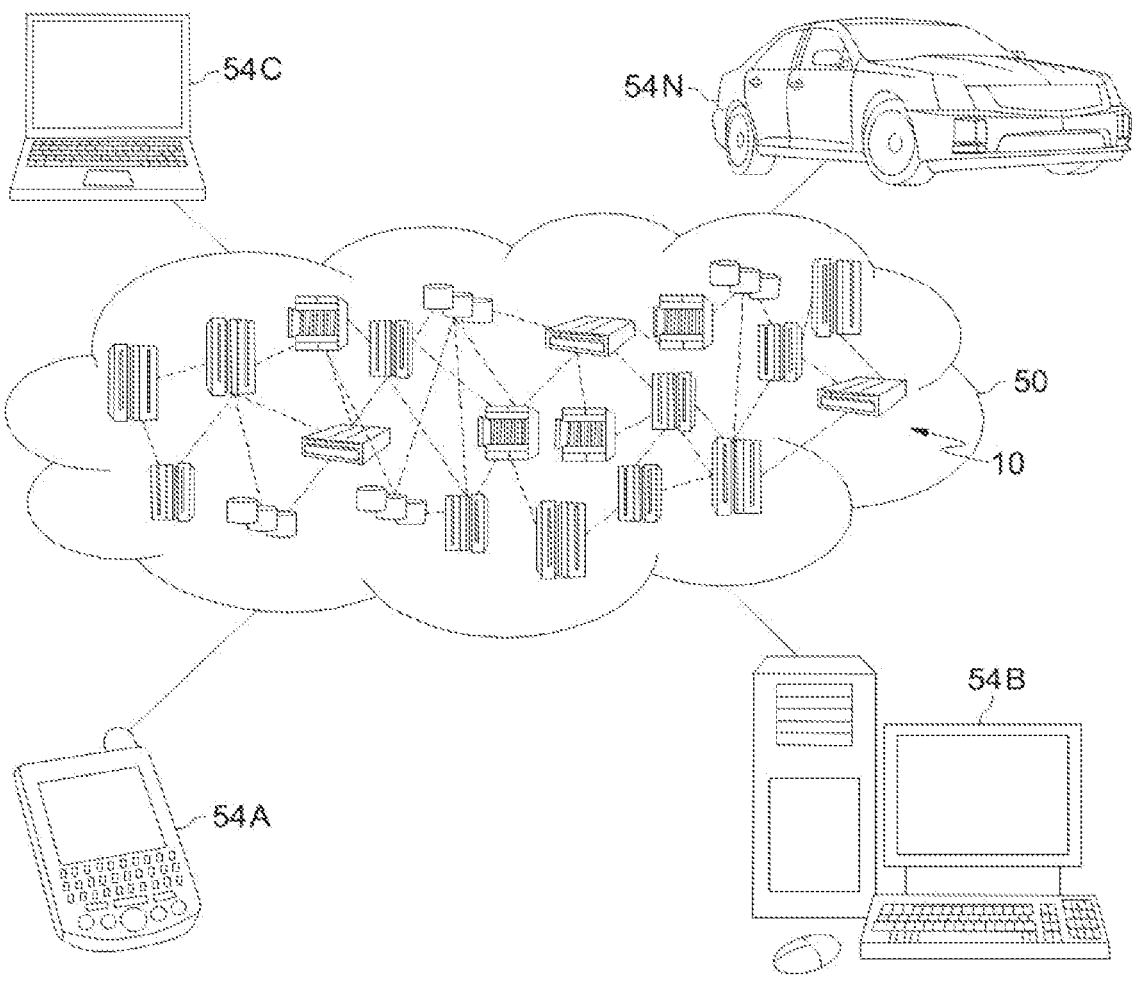
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
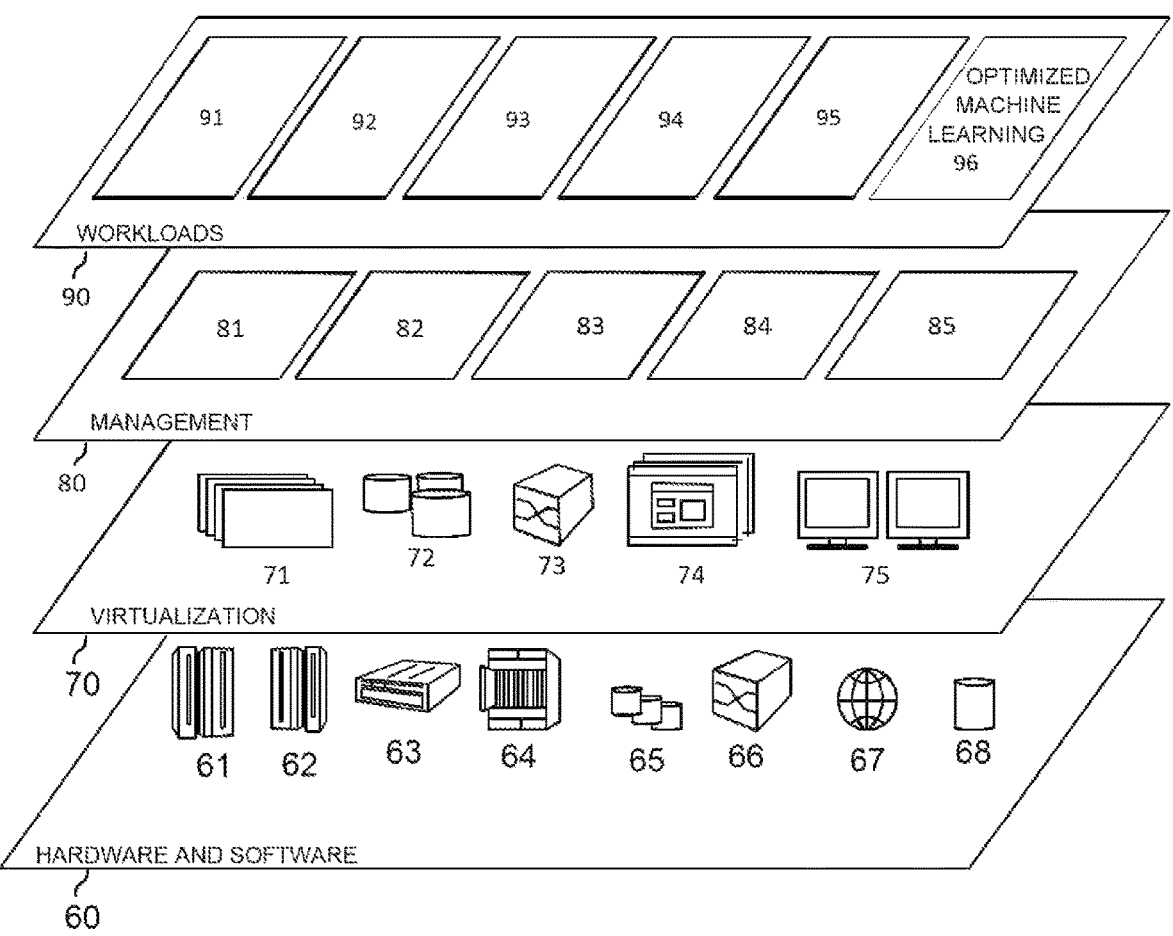
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimized machine learning 96, which may include workloads, functions, techniques, algorithms, and methods for integrated optimized machine learning for complex physical processing systems, in accordance with various aspects of this disclosure.

Implementations of the disclosure may include a computer system/server 12 of FIG. 1 in which one or more of the program modules 42 are configured to perform (or cause the computer system/server 12 to perform) one of more functions of the optimized machine learning 96 of FIG. 3. For example, the one or more of the program modules 42 may be configured to: train a plurality of machine learning predictive models, thereby generating a plurality of trained machine learning predictive models; generate a solved machine learning optimization model, based at least in part on the plurality of trained machine learning predictive models; and output one or more control inputs and predicted outputs based at least in part on the solved machine learning optimization model, in various examples.

Figure 4:
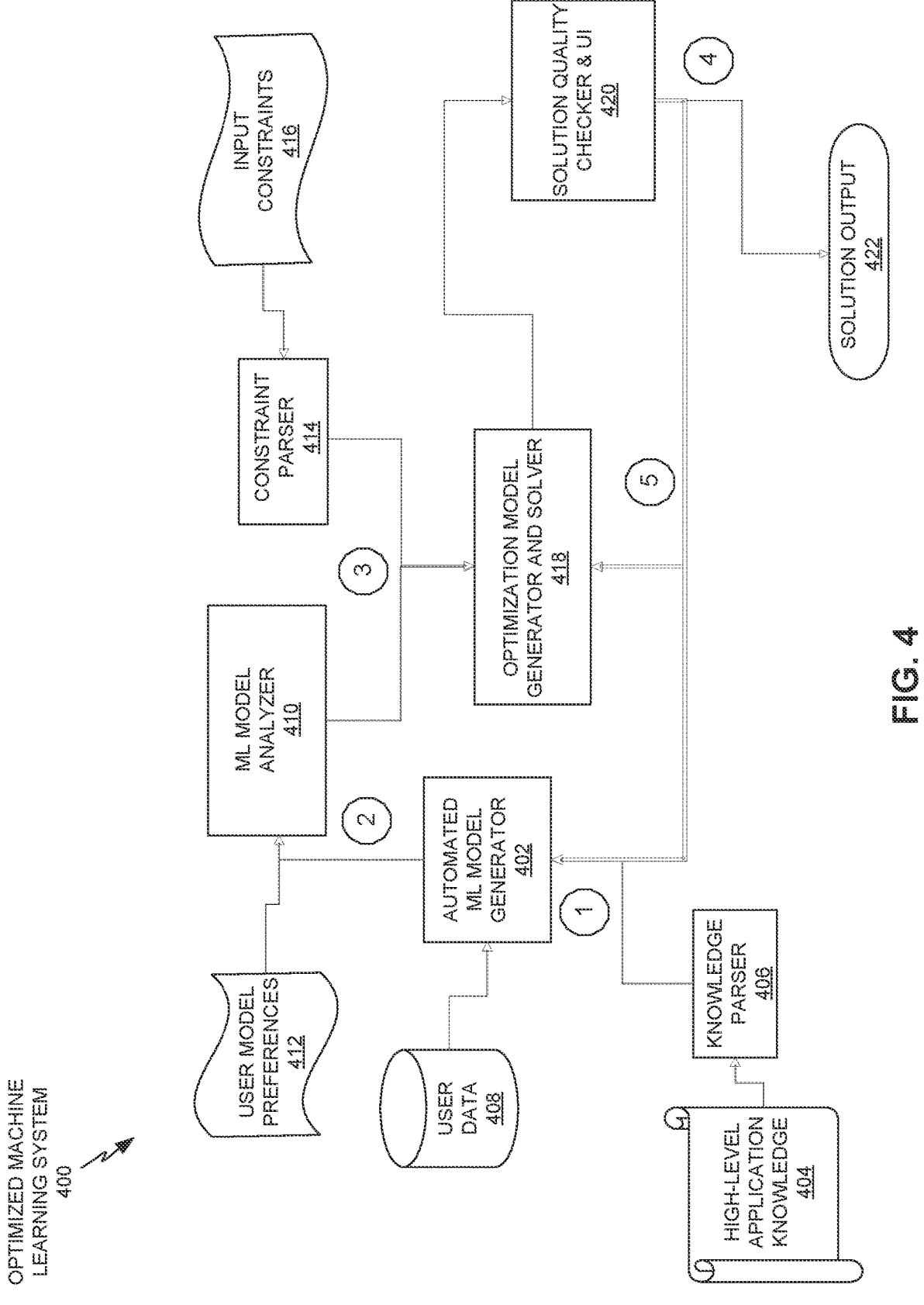
FIG. 4 shows a block diagram of an exemplary environment in accordance with aspects of the disclosure.

FIG. 4 shows a block diagram of an exemplary system architecture for an optimized machine learning system 400 in accordance with aspects of the disclosure. Optimized machine learning system 400 may be the same or analogous as optimized machine learning system 96 of FIG. 3, or another implementation thereof, in various examples. In various embodiments, the optimized machine learning system 400 may include an automated machine learning (ML) model generator 402, a knowledge parser 406, an ML model analyzer 410, a constraint parser 414, an optimization model generator and solver 418, and a solution quality checker and user interface (UI) 420, each of which may comprise one or more program modules such as program modules 42 described with respect to FIG. 1, and which may be implemented using one or more processing devices, processors, or processing units 16, and/or computing devices such as one or more computer system/server 12, such as are described above with reference to FIG. 1. As indicated above, these may be considered "program modules" in the broadest possible sense of portions of software code or processing device executable instructions of any kind, and are not limited to any definition of "module" within any particular programming language or framework or software engineering paradigm or context. Optimized machine learning system 400 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Solution quality checker and UI 420 is configured to facilitate user interaction with potential solutions and to engage in gauging the quality of generated solutions, and to generate solution outputs 422. Optimized machine learning system 400 may further include high-level application knowledge 404, user data 408, user model preferences 412, and input constraints 416, as further explained below, and which may be embodied as any combination of data, metadata, files, or other suitable forms.

Optimized machine learning system 400 in the example of FIG. 4 may further include high-level application knowledge 404 which may be entered into it for a particular knowledge domain of a particular application. The knowledge parser 406 may ingest and parse inputs from high-level application knowledge 404 and feed inputs representative of the parsed information to automated ML model generator 402. Optimized machine learning system 400 further includes user data 408 which may also be entered to automated ML model generator 402. Automated ML model generator 402 may generate and output a variety of ML models of various ML model types, making use of the parsed domain knowledge received from knowledge parser 406 and of the user data 408. Knowledge parser 406 may thus parse domain knowledge or application knowledge, and automated ML model generator 402 may train a plurality of machine learning predictive models based at least in part on the parsed domain knowledge.

Optimized machine learning system 400 may further include user model preferences 412, which may indicate user-selected preferences regarding ML models and/or their characteristics to use. ML model analyzer 410 may receive ML models from automated ML model generator 402 and user model preferences 412, and analyze the ML models it receives, with the user model preferences 412 taken into account, and output the ML model complexity analyses together with the ML models, to optimization model generator and solver 418. For example, ML model analyzer 410 may analyze the ML model complexity, the ML accuracy, and the optimization class similarity of the ML models it receives.

Optimized machine learning system 400 may further include input constraints 416, which may be outputted to constraint parser 414. Constraint parser 414 may pass parsed constraints as outputs to optimization model generator and solver 418, in parallel with the ML models and model analyses passed from ML model analyzer 410 to optimization model generator and solver 418, all of which optimization model generator and solver 418 may then use as inputs for generating and solving physical system control optimization models based on the ML models, the ML model analyses, and the parsed input constraints, in various examples. Constraint parser 414 may thus parse machine learning optimization input constraints, and optimization model generator and solver 418 may thus generate solved machine learning optimization models based at least in part on the parsed machine learning optimization input constraints.

Figure 5:
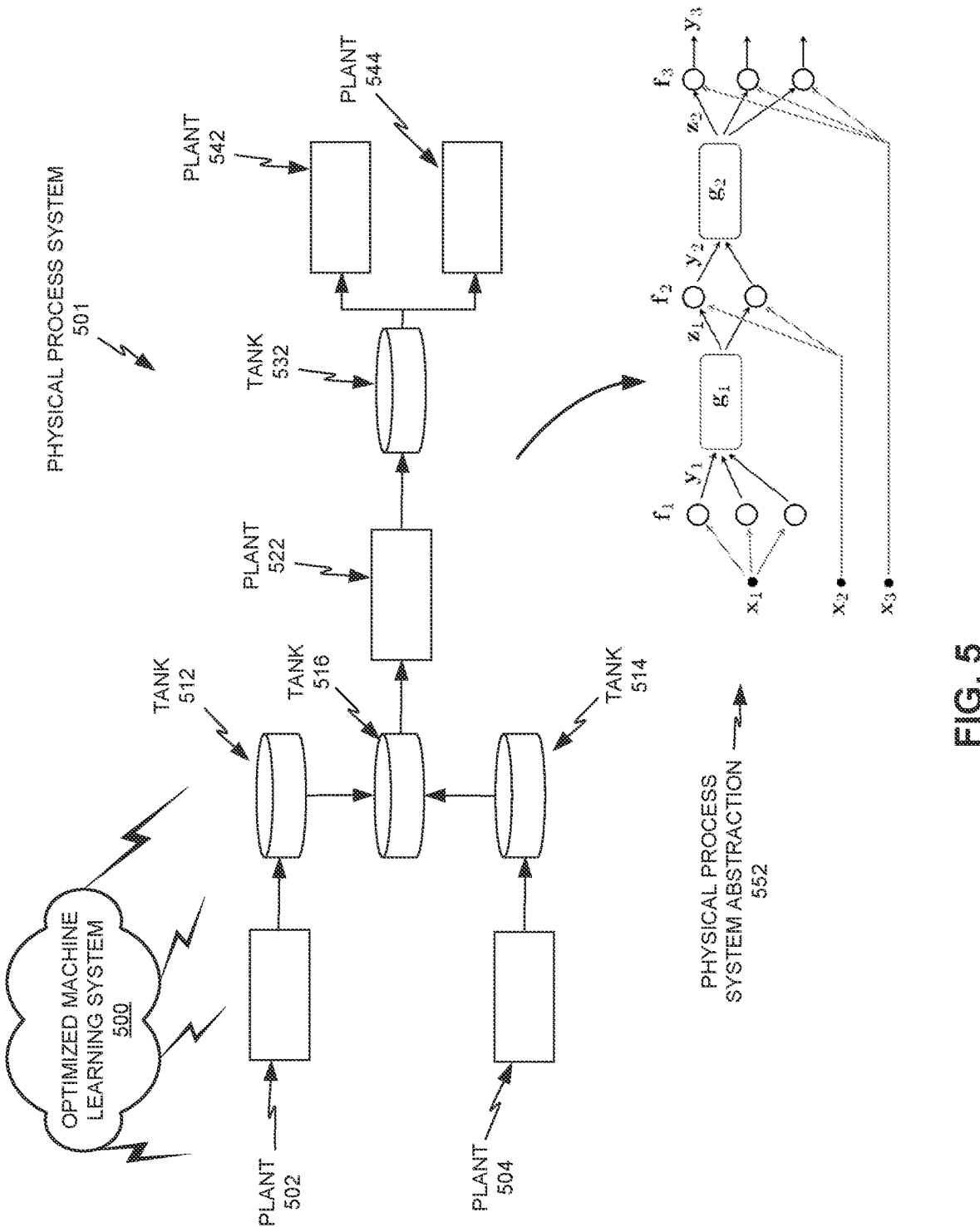
FIG. 5 shows a conceptual diagram of a physical process system that may be a target physical process system to be controlled by an optimized machine learning system in accordance with aspects of the disclosure.

FIG. 5 shows a conceptual diagram of a physical process system 501 that may be a target physical process system to be controlled by an optimized machine learning system 500 of this disclosure, in various examples. Optimized machine learning system 500 may be the same or analogous as optimized machine learning system 96 of FIG. 3 and/or optimized machine learning system 400 of FIGS. 3 and 4, or another implementation thereof, in various embodiments. Physical process system 501 may be a petroleum product refining system, or a complex retail logistics and sales system, for example. In either of these or various other examples, physical process system 501 may comprise various processing nodes and reservoirs, where the processing nodes receive inputs, process them, and generate outputs as the processed products of the inputs, and the reservoirs may simply hold and/or transport an accumulation of inputs received before outputting them, at substantially the same or a different location. In a petroleum product processing example, the initial inputs may be raw materials such as tar sands, refining products, water, and so forth, and the final outputs may be refined products such as petroleum, oil, and hydrogen, and the like. In a commercial logistics and sales example, the raw materials may be cloth, leather, thread, and the like, delivered to one or more factories, as well as customer returns delivered to retail stores or fulfillment centers, and the final products may be shoes and jackets delivered to retail stores and online sale fulfillment centers, for example.

The example of FIG. 5 may be discussed in terms of a petroleum product refining system that comprises a network of multiple plants 502, 504, 522, 542, 544, and tanks 512, 514, 516, and 532, in the arrangement as shown in FIG. 5, and which may be configured with a control system enabled to control all of the plants, and which must be programmed or controlled suitably to achieve desired outputs and/or other outcomes. Each of the plants has a self-contained set of inputs and outputs, as shown. Each of the plants may also have some uncontrolled (or partially controlled) inputs, such as ambient temperature (in the absence of sophisticated thermal controls), as well as controlled inputs, such as voltage and additive flow rates. For each plant, an outflow from an upstream process becomes an inflow into a downstream process. Physical process system 501 thus forms a complex relationship between the various setpoints, material inflows, and throughput. Physical process system 501 thus poses a system-wide control problem: to identify operating setpoints for each of plants 502, 504, 522, 542, 544, in which the operating setpoints of each plant contributes complex interactions to the operation of physical process system 501 as a whole. Taken all together, the combination of possible operating setpoints for each of plants 502, 504, 522, 542, 544, as well as the interaction of tanks 512, 514, 516, and 532, present a very large and complexly interacting system to manage to generate the desired outputs, with the desired characteristics, of the system as a whole.

The optimized machine learning system 500 in examples of this disclosure may analyze all aspects of physical process system 501. The optimized machine learning system 500 may analyze and estimate the production process of each of plants 502, 504, 522, 542, 544 using a regression function, for example. The optimized machine learning system 500 may analyze and characterize the controlled and uncontrolled inputs to each of the plants 502, 504, 522, 542, 544, the production processing performed at each of the plants, and the expected resulting outputs of each of the plants. The optimized machine learning system 500 may build on its analyses of the individual plants 502, 504, 522, 542, 544 and the individual tanks 512, 514, 516, and 532 (e.g., volume, or carrying capacity) and characterize the entire system of physical process system 501 in a physical process system abstraction 552, which may be a generalized network representation representing each applicable node $f_1$ (e.g., each plant) as a regression function. (Physical process system abstraction 552 as shown in FIG. 5 is an example conceptual representation, and the graphical disclosure of FIG. 5 is not limited to any exact correspondence of physical process system abstraction 552 to physical process system 501 or any other particular physical process system.) The optimized machine learning system 500 may then analyze physical process system abstraction 552 such as in a regression analysis, a conceptual example of the beginning of one of which may be as follows:

$$\min_{X} = \phi(y_L)$$
$$\text{s.t.} \quad y_1 = f_1(x_1),$$
$$y_l = f_l(z_{l-1}, x_l) \forall\, l = 2, \dots, L,$$
$$A_l y_f + B_l z_i \le b_l,\, \forall\, l = 1, \dots, L-1,$$
$$\underline{x}_l \le x_l \le \overline{x}_l \forall\, l = 1, \dots, L,$$

where $x_l$ are control variables with operational limits $\underline{x}_l$, $\overline{x}_l$, $z_l$ are flow rates, $y_l$ is the output for the process $f_l$, $\phi$ is the objective function, $A_l y_f + B_l z_i \le b_l$ captures flow balance constraints, L is the number of layers in the network.

Figure 6:
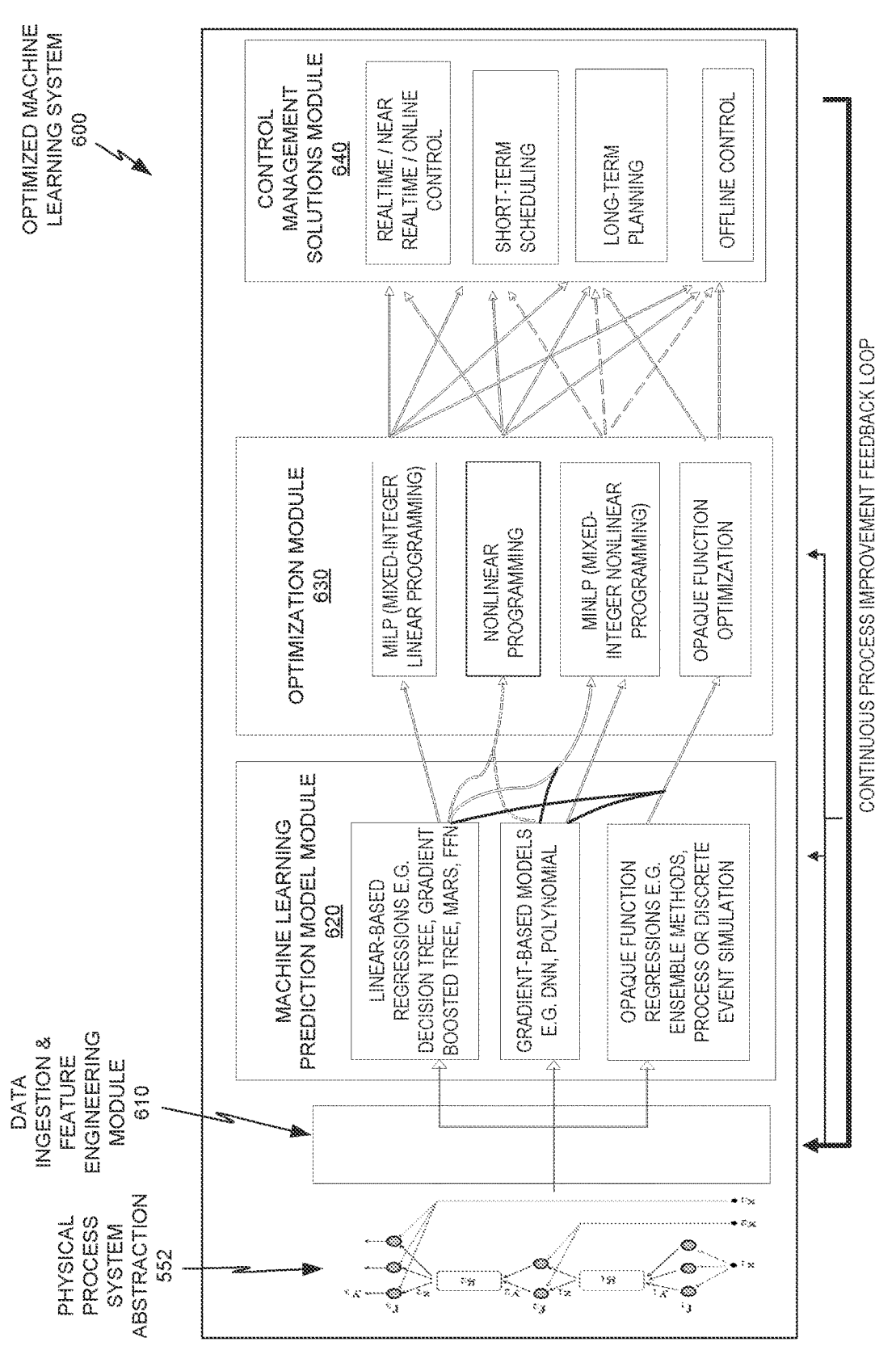
FIG. 6 shows a conceptual system diagram of an example machine learning optimization system in accordance with aspects of the disclosure.

FIG. 6 shows a conceptual system diagram of an example optimized machine learning system 600, in accordance with an example of this disclosure. Optimized machine learning system 600 of FIG. 6 may be the same or analogous as any or all of optimized machine learning systems 96, 400, and/or 500 of FIGS. 3, 4, and 5, or another implementation thereof, in various embodiments. Optimized machine learning system 600 of FIG. 6 may be adapted to enable end-to-end coupling automation of machine learning predictive models and optimization models, in accordance with various examples. Optimized machine learning system 600 may analyze a physical process system and create a physical process system abstraction 552 based thereon, as described above. Optimized machine learning system 600 may be implemented as a Directed Acyclic Graph (DAG). Optimized machine learning system 600 may implement an Automated Decision Optimization (Auto-DO) prediction-optimization pipeline for optimized control management, and may implement novel techniques, processes, methods, and systems of automated optimization machine learning model creation, in various examples.

Optimized machine learning system 600 may process physical process system abstraction 552 and other information and data about the physical process system through a data ingestion and feature engineering module 610, which may map features to inputs, outputs, and controls, for example. "Module" as used in "data ingestion and feature engineering module 610" and in all other modules described with reference to FIG. 6 may refer to any subsystem, component, or portion of software code of any kind, and are not limited to any particular specialized definition or connotation of the term "module" in any particular programming language or framework or other software engineering field or paradigm.

Optimized machine learning system 600 may pass all information including the processing results of data ingestion and feature engineering module 610 through machine learning prediction model module 620, which may generate any of a wide variety of machine learning predictive models, based on the information and data it receives on the target physical process system. These machine learning predictive models generated by machine learning prediction model module 620 may include any one or more linear-based regression analyses, such as decision trees, gradient boosted decision trees, MARS or open-source analogs thereof, feed-forward networks (FFNs), and so forth. These machine learning predictive models generated by machine learning prediction model module 620 may include gradient-based models, such as deep neural networks (DNNs), polynomial models, and so forth. These machine learning predictive models generated by machine learning prediction model module 620 may include opaque function regression models such as ensemble methods or discrete event simulations, for example. These machine learning predictive models generated by machine learning prediction model module 620 may include additional models, and any combination of any one or more of any of the examples listed above and/or other examples. Machine learning prediction model module 620 may correspond to an implementation of automated machine learning model generator 402 of the example of FIG. 4, in some examples. Machine learning prediction model module 620 may output all of the machine learning prediction models it generates, along with all other information, data, analyses, and any other communications it has received with reference to the target physical process system, to optimization module 630.

Optimization module 630 may perform or implement any one or more of a wide variety of optimization algorithms, techniques, processes, or methods on the machine learning prediction models it receives from machine learning prediction model module 620. As illustrative examples, optimization module 630 may perform optimizations on the machine learning prediction models based on mixed-integer linear programming (MILP), nonlinear programming, mixed-integer nonlinear linear programming (MINLP), opaque function optimization, and/or any other kind or basis for optimization. Optimization module 630 may correspond to an implementation of optimization model generator and solver 418 of the example of FIG. 4, in some examples. Optimization module 630 may pass its resulting optimization outputs from any one or more optimization techniques, and any or all other information, data, models, and/or other communications it has received, to control management solutions module 640.

Control management solutions module 640 may select from and/or use any optimized machine learning prediction model and/or any other information, data, models, or other communications it receives from optimization module 630 to generate control inputs, and in some examples, predicted outputs, for output to any one or more components, subsystems, or other elements of a target physical process system to be controlled, such as physical process system 501 of FIG. 5, for example. Control management solutions module 640 may generate control inputs and predicted outputs in the form of realtime, near-realtime, delayed, and/or online controls; short-term scheduled controls; long-term planning; and/or offline controls, and/or any other types of controls, in various examples. As specific examples in a tar sands petroleum processing system example, control inputs and predicted outputs may include a rate at which to add fiberizing and injection of binders to the output of a slag and basalt melting process, or a melting temperature, a curing temperature, a conveyer belt rate, or a cement grinding rate of said process. Control management solutions module 640 may correspond to an implementation of solution quality checker and UI 420 and/or solution output 422 of the example of FIG. 4, in some examples. Control management solutions module 640 may thus output one or more control inputs and predicted outputs, which may include outputting one or more control outputs selected from among one or more of: realtime control inputs, near-realtime control inputs, online control inputs, short-term scheduling control inputs, long-term planning control inputs, and offline control inputs, for example. "Inputs" and "outputs" may include any signals, transmissions, communications, encodings, or any other physically detectable phenomena that are susceptible of being outputted by any one device, system, product, or other thing and inputted to any other device, system, product, or other thing, including in the context and sense in which such terms are or may be used throughout this disclosure, in various examples.

Control management solutions module 640 may include a UI and capability for user interaction and management, in outputting and presenting various optimized machine learning control solutions in a UI for human-in-the-loop interaction, engagement, management, and oversight, prior to and/ or in parallel with outputting control signals to one or more components, modules, subsystems, or other portions of a physical process system to be controlled, in some examples. In some examples, control management solutions module 640 may output one or more outputs in the form of recommendations for control signals in a UI for one or more human operators to consider and evaluate, where the actual controls are reserved for and under the control of the one or more human operators, who may exercise their professional judgment as to whether or to what degree to accept the recommendations outputted by control management solutions module 640 before engaging any control signals or modifying any existing control signals for a physical process system.

Optimized machine learning system 600 may also convey outputs from control management solutions module 640 back to any one or more of data ingestion and feature engineering module 610, machine learning prediction model module 620, and optimization module 630 to implement a continuous process improvement feedback loop, in some examples. Any one or more of data ingestion and feature engineering module 610, machine learning prediction model module 620, and optimization module 630 may receive, process, and incorporate further information, data, models, hyperparameters, metadata, or any other form of feedback or other signals from control management solutions module 640, and use such feedback or other signals as additional information with which to improve their functioning, potentially in a continuous process feedback loop, in some examples.

In some examples, the decision optimization pipeline of optimized machine learning system 600 may evaluate and optimize for potential machine learning models based on three coupled metrics or characteristics: machine learning accuracy, optimization solution quality, and speed of convergence. Machine learning accuracy may refer to the accuracy with which any machine learning system may successfully analyze or reproduce factual characteristics and predictions of a physical system, such as accurately classifying hand-written letters and numbers. For example, optimized machine learning system 600 may generate and perform optimization analysis on machine learning models of various types such as naïve Bayes, J48 and/or C4.5 decision tree, random forest, boosted decision tree, a deep neural network, and a reinforcement learning network (and may generate and test many versions of each, with different sets of hyperparameters), and may track the maximum accuracy of each, potentially after each of a successive number of training runs, potentially incorporating updated data sets. Optimization solution quality may refer to the quality of optimization solutions which may exist in a continuous multi-dimensional space with global and local maxima and minima, such that optimized machine learning system 600 may perform any of a variety of techniques of optimization solution search through the relevant space, with multiple techniques and constraints such as gradient descent to follow the space to a local minimum, yet also with a meta-optimized (since it is separate from and above the primary optimization component of the processes of optimized machine learning system 600) or other appropriate countervailing capability of broader search, to enable escaping a local and potentially trivial local minimum in favor of a global minimum (i.e., the ideal global solution available to that machine learning optimization process) or at least a greater local minimum. Speed of convergence may assume that the overall techniques employed by optimized machine learning system 600 enable at least an overall convergence toward a desired solution over time, and may refer to the speed with which optimized machine learning system 600 is able to converge toward a global or at least a local or "good enough" overall solution for an optimization of a machine learning model, in various examples.

Optimized machine learning system 600 may perform a constrained optimization (or meta-optimization, since it is separate from and above the primary optimization component) among these three characteristics, with respect to criteria applicable to a given target physical process system and to desired outputs and desired outcomes with the target physical process system. More or less weight of importance may be placed on one or more of machine learning accuracy, optimization solution quality, and speed of convergence, depending on a particular target physical process system and on any applicable desired outputs and desired outcomes with regard to that particular target physical process system. For example, it may be possible to increase the maximum machine learning accuracy of any machine learning models generated by optimized machine learning system 600, relative to an initial baseline, by 5%, but in the process, reducing the optimization solution quality of that machine learning model with maximum accuracy by 20% from the same baseline, for example, which may be overall counterproductive and overall counter to the desired outcomes of a particular physical process system control scenario. Or, it may be possible to meta-optimize for a combination of both machine learning accuracy and optimization solution quality, but only by inherently devoting far greater overall processing power to the task, which may push the convergence time to target control values into extremes, or conversely, slow the speed of convergence to a very low level, potentially a level too slow to be useful for a given physical process system control scenario, particularly if high reactivity rate and realtime or near-realtime controls are needed or desired, for example.

Some machine learning models with some sets of hyperparameters may be clearly non-competitive, and optimized machine learning system 600 may eliminate clearly non-competitive machine learning models from further consideration. In some situations, machine learning models may detect an emergence of a clear best choice of machine learning model that provides an overall maximum performance with respect to desired performance characteristics with respect to all three of machine learning accuracy, optimization solution quality, and speed of convergence. In many other examples, optimized machine learning system 600 may assess that there is a rich portfolio of different machine learning models with different sets of hyperparameters that may all be, or may appear prior to further analysis to be, competitive with each other in a complex set of tradeoffs among machine learning accuracy, optimization solution quality, and speed of convergence, and potentially other performance criteria to be taken into consideration.

Thus, suitable implementation of an optimized machine learning system 600 may take into account various substantive implementation design questions, such as: which machine learning models should be used to begin with as candidate machine learning models for optimized machine learning system 600; how should the prediction uncertainty of different machine learning models be managed; and when and/or by what criteria should optimized machine learning system 600 perform updated training runs on its machine learning models, using newly accumulated data from the target physical process system, and/or using newly added features from the target physical process system, and/or using newly accumulated continuous improvement feedback from optimized machine learning system 600 itself. Each of these implementation design criteria may pose significant effects on the operation of optimized machine learning system 600 and thus on the control of the target physical process system. Which machine learning models should be used to begin with as candidate machine learning models for optimized machine learning system 600 may impact running times and decision quality, for example. How the prediction uncertainty of different machine learning models is managed may impact how the decision solution quality from the automated decision optimization pipeline is quantified, and may raise questions regarding the optimum design of feedback signals and how to incorporate them to improve the optimization model and the machine learning models, for example. Criteria of when and/or how to perform updated training of the machine learning models may be based on changes in operating conditions, or in response to an assessment that the machine learning accuracy (or prediction accuracy) of the machine learning models is not as expected, and there may be justification in refactoring the machine learning models with greater numbers of features or a wider or more applicable set of hyperparameters, for example.

In some examples, optimized machine learning system 600 may encode a regression function in mixed-integer linear programming (MILP), as illustratively shown as one sub-module in optimization module 630 in FIG. 6. For example, optimized machine learning system 600 may encode a deep neural network machine learning model with feedforward architecture as follows:

$$f_I(x) = W_K \sigma(\sigma( \ldots (\sigma(\sigma(W_1 x + b_1) + b_2) \ldots + b_{K-1}) + b_K \qquad (1)$$

in which sigma is a Rectified Linear Unit (ReLU), $W_l$ is the weights, $b_l$ is the bias term, and this equation defines a nonlinear representation of the deep neural network.

Optimized machine learning system 600 may generate an exact linear representation based on this same deep neural network machine learning model as follows:

$$f_I(x) = W_K x_{K-1} + b_K \qquad (2)$$

$$x_k - s_k = W_k x_{k-1} + b_k, k = 1, \ldots, K-1$$

$$x_k, s_k \geq 0, k = 1, \ldots, K-1$$

$$z_k \in \{0, 1\}^{n_k}, k = 1, \ldots, K-1$$

$$x_k \leq U_k z_k, k = 1, \ldots, K-1$$

$$s_k \leq -L_k(1 - z_k), k = 1, \ldots, K-1$$

$$x_0 = x.$$

by using additional variables $s_k$, $z_k$, $x_k$ and parameters $U_k$ and $L_k$.

Optimized machine learning system 600 may incorporate this and further analysis into a further exact linear representation mixed-integer linear programming (MILP) model for the decision-making problem as follows:

$$\min_X = \phi(y_L)$$

$$\text{s.t.} \quad y_1 = f_1(x_1),$$

$$y_l = f_l(z_{l-1}, x_l) \forall l = 2, \ldots, L,$$

$$A_l y_f + B_l z_l \leq b_l, \forall l = 1, \ldots, L-1,$$

$$\underline{x}_l \leq x_l \leq \overline{x}_l \forall l = 1, \ldots, L,$$

which may correspond to a global minimum, i.e., an ideal global machine learning optimization solution for this particular deep neural network machine learning model by using a global optimization MILP solver.

As part of machine learning model selection, optimized machine learning system 600 may perform characterization of regression functions. A regression model can have different mathematical representations, such as a compact non-linear function whose gradients are available, a mixed-integer linear program (MILP), or an opaque function, for example. For example, optimized machine learning system 600 may encode a representation of a deep neural network (DNN) with feedforward architecture in either a nonlinear representation or an exact linear representation mixed-integer linear programming (MILP) model, as demonstrated above in Equations (1) and (2). A regression model may be characterized by the features of: machine learning test accuracy; model representation complexity, as may be characterized by, e.g., the number of unknowns; and optimization class similarity, e.g., optimized machine learning system 600 may combine a nonlinear programming (NLP) model with another NLP mode, rather than combining an NLP model with a mixed integer linear programming (MILP) model, in some examples.

To elaborate on model representation complexity, ML models may be classified into three general groups: MILP models, gradient-based nonlinear functions, and opaque function models. An ML model may belong to more than two of these classification groups; for example, a MARS model or an open-source analog thereof may be classified in the MILP group or in the gradient-based nonlinear group. A MILP representation of a MARS model may be as follows:

$$h(x) = \alpha_0 + \sum_{i=1}^N \alpha_i y_i$$

$$\text{s.t.} \ y_i \geq w_i^T x + c_i, i = 1, \ldots, N$$

$$y_i \leq \left(w_i^T x + c_i\right) + M_3 e_i, i = 1, \ldots, N$$

$$y_i \leq M_4(1 - e_i), i = 1, \ldots, N$$

$$e_i \in \{0, 1\}, y_i \geq 0, i = 1, \ldots, N,$$

where $y_i$, $e_i$ are additional variables, $w_i$, $c_i$, $\alpha_0$, $\alpha_i$, $M_3$, $M_4$, N are model parameters. However, a gradient-based nonlinear representation of a MARS model may be as follows:

$$h(x) = \alpha_0 + \sum_{i=1}^N \alpha_i h_i(x), h_i(x) = \max\{w_i^T x + c_i, 0\}$$

Optimized machine learning system 600 may evaluate the complexity of a MARS model differently depending on which of these classification representations is used. Optimized machine learning system 600 may assess the complexity of a MILP representation of a MARS model $$\left(c_{MILP}^{MARS}\right)$$

and a gradient-based nonlinear representation of the same MARS model $$\left(c_{NLP}^{MARS}\right)$$

as follows, respectively:

$$c_{MILP}^{MARS} = \text{\# of continuous variables} + 2\text{\# of integer variables} + 2\text{\# of big-}$$

$$M \text{ params} + \text{\# of constraints} = d + 9N$$

-continued $$c_{NLP}^{MARS} =$$

$2\# \text{ of continuous variables} + \# \text{ of model parameters} = (N + 1)(d + 1) + N$ Where "#" stands for "the number of", $M_i$ is the big-M parameters, $x \in \mathbb{R}^d$, d is the number of features.

For a decision tree, optimized machine learning system 600 may assess the complexity as follows. For each leaf node $\ell \in \mathcal{L}$, a linear model $$r_\ell(x) = w_\ell^T x + c_\ell$$

may be learned from the training data based on the points assigned to the leaf node. For each branch node $\ell \in \mathcal{B}$, there may be a hyperplane $$a_\ell^T x + b_\ell, \text{ where if } a_\ell^T x + b_\ell < 0$$

then the point x will follow the left branch from the node, otherwise it splits into the right branch. Optimized machine learning system 600 may then model a MILP regression function for a decision tree as follows:

$$h(x) = \sum_{\ell \in \mathcal{L}} r_\ell y_\ell$$

$$\sum y = 1.$$

$$a_k^T x + b_k < M_1(1 - e_\ell), \forall \ell \in \mathcal{L}, k \in \mathcal{N}_L(\ell)$$

$$a_k^T x + b_k \geq -M_2(1 - e_\ell), \forall \ell \in \mathcal{L}, k \in \mathcal{N}_R(\ell),$$

$$y_\ell^L e_\ell \leq y_\ell \leq y_\ell^U e_\ell$$

$$w_\ell^T x + c_\ell - y_\ell^U(1 - e_\ell) \leq y_\ell \leq w_\ell^T x + c_\ell - y_\ell^L(1 - e_\ell).$$

$$e_\ell \in \{0, 1\}, \forall \ell \in \mathcal{L}$$

where:
$\mathcal{L}$ is the set of leaf nodes and $\mathcal{B}$ is the set of branch nodes
$\mathcal{N}_L(\ell)$: the ancestor nodes of $\ell$ where the left branch is followed on the path from the root to $\ell$
$\mathcal{N}_R(\ell)$: the set of right branch ancestors on the path
$M_1$ and $M_2$: big numbers $$y_\ell^L \text{ and } y_\ell^U:$$

some constants (lower and upper bounds)
Optimized machine learning system 600 may assess the complexity of $$MILP(c_{MILP}^{DT}) \text{ and } NLP(c_{NLP}^{DT})$$

representations of the tree model as follows, respectively:

$$c_{MILP}^{DT} = d + 9 * |\mathcal{L}| + 3\sum_{\ell \in \mathcal{L}}(|\mathcal{N}_L(\ell)|) + 1$$

$$c_{NLP}^{DT} = 2 * d + (d + 1)(|\mathcal{L}| + + |\mathcal{B}|)$$

Analogously, optimized machine learning system 600 may assess the complexity of MILP and NLP representations of random forest, deep neural network, and opaque function models as follows, respectively:

$$c_{MILP}^{RF} = d + \sum_{t \in T}\left(9 * |\mathcal{L}_t| + 3\sum_{\ell \in \mathcal{L}_t}\left(|\mathcal{N}_{L_t}(\ell)| + |\mathcal{N}_{R_t}(\ell)|\right) + 1\right)$$

$$c_{NLP}^{RF} = 2 * d + \sum_{t \in T}(d + 1)(|\mathcal{L}_t| + |\mathcal{B}_t|)$$

$$c_{MILP}^{DNN} = n_0 + 13\sum_{k=1}^{K-1} n_k$$

$$c_{NLP}^{DNN} = 2 * d + \sum_{k=0}^{K}(n_k * n_{k-1} + n_k)$$

$$c_{MILP}^{BLB} = c_{NLP}^{BLB} = 10^{20}$$

where T is the set of decision trees, $\mathcal{L}_t$ is the set of leaf nodes and $\mathcal{B}_t$ is the set of branch nodes of the t-th tree, K is the number of layers in the deep neural network, $n_k$ is the number of neurons in the k-th layer, d is the number of features.

Optimized machine learning system 600 may implement an ML model selection algorithm for optimization in accordance with various examples. Optimized machine learning system 600 may sort by optimization solver tractability, by the resulting optimization problem type, in the following order of descending complexity and ascending tractability and preference: opaque function optimization, MINLP, NLP, MILP, and convex optimization. Optimized machine learning system 600 may use model similarity criterion to select a mathematical representation for ML models so that the final optimization follows the tractability order; that is, optimized machine learning system 600 may preferentially use ML models in the same type and with better trackability. For example, optimized machine learning system 600 may preferentially use $\{f_1=\text{NLP}, f_2=\text{NLP}\}$ rather than $\{f_1=\text{MILP}, f_2=\text{NLP}\}$, and $\{f_1=\text{MILP}, f_2=\text{MILP}\}$ rather than $\{f_1=\text{MILP}, f_2=\text{NLP}\}$ or $\{f_1=\text{NLP}, f_2=\text{NLP}\}$.

Optimized machine learning system 600 may assess control management requirements for decision quality and running time, to determine which ML models to use based on machine learning test accuracy and model complexity, in some examples. When carrying out optimization, optimized machine learning system 600 may optimize covariates with high feature importance first, in some examples. For selected noisy nonlinear and opaque function models, optimized machine learning system 600 may smooth the function by a convolution with a Gaussian kernel, which may reduce noise and complexity and increase tractability, for example.

Optimized machine learning system 600 may also assess decision quality. Some prediction models with high machine learning test accuracy may end up with a low quality of decision, e.g., a setpoint determined based on sparse data due only to a low historical data density. Optimized machine learning system 600 may implement a metric for quantifying the quality of automated decision optimization, or "AutoDO," solution, including in the absence of a real physical process system or simulator interactions. Given a historical dataset $D_f = \{(x_1, y_1), \ldots, (x_n, y_n)\}$ where $y_i = f(x_i)$ and the suggested setpoint $\hat{x}$, optimized machine learning system 600 may process with a goal to estimate an improvement in the value of the optimal observed point $$f(\hat{x}) - f_n^*$$

where $$f_n^* = \max_{i \leq N} f(x_i).$$

Optimized machine learning system 600 may model f as a probability distribution with a Gaussian process prior $$f(x_t) \sim GP\big(\mu_t(x), \sigma_t^2(x)\big)$$

$$\mu_t(x) = k_t(x)^T\big(K + \sigma^2 I_t\big)^{-1} y_t,$$

$$\sigma_t^2(x) = k(x, x) - k_t(x)^T\big(K + \sigma^2 I_t\big)^{-1} k_t(x).$$

Optimized machine learning system 600 may measure decision quality for x by the expected improvement for each decision optimization (DO) pipeline, as follows:

$$EI_n(x) :=$$

$$E_n[[f(x) - f_n^*]^+] = [\Delta_n(x)]^+ + \sigma_n(x)\varphi\left(\frac{\Delta_n(x)}{\sigma_n(x)}\right) - |\Delta_n(x)|\Phi\left(\frac{\Delta_n(x)}{\sigma_n(x)}\right),$$

$$\text{where } \Delta_n(x) := \mu_n(x) - j_n$$

A big value for $EI_n(x)$, for example $EI_n(x)=0.9$, is understood as a high decision quality, while a small value for $EI_n(x)$, for example $EI_n(x)=0.01$, is understood as a low decision quality.

If the values are too small for all pipelines, for example $EI_n(x)<0.01$, optimized machine learning system 600 may add a regularizer to the optimization problem, as max|x−x*|, for example. This term may serve as a feedback signal to improve the optimization model.

Thus, in various examples, an optimized machine learning system of this disclosure may provide novel advantages in an automated end-to-end optimization framework that combines automated machine learning and optimization; that may perform ML model selection by analyzing machine learning model complexity, machine learning accuracy, and optimization class similarity; and that may enable feedback on optimization solution quality to update ML models and optimization models. An optimized machine learning system of this disclosure may automatically relax constraints based on the quality of optimization solutions, in various examples. An optimized machine learning system of this disclosure may revise and rebuild ML models based on feedback from optimization solutions, and optionally also from inputs from human operators and/or other end users, in various examples.

FIG. 7 shows a flowchart of an exemplary method 700 in accordance with aspects of the present disclosure. Steps of the method 700 may be carried out in the architecture of any one or more of the examples of FIGS. 3, 4, and 6, and are described with reference to elements depicted in the example of FIG. 4.

An optimized machine learning system of this disclosure, such as optimized machine learning system 400 of FIG. 4, may receive high-level domain knowledge or high-level application knowledge 404 and user data 408 as input (702). The knowledge parser 406 may parse domain knowledge into forms understood by automated ML model generator 402 (704). Automated ML model generator 402 may automatically build ML pipelines and build ML models (706).

ML model analyzer 410 may optionally take users' model preferences 412 as input (708). ML model analyzer 410 may receive built ML models from automated ML model generator 402 (710), analyze the built ML models (712), such as in terms of the complexity, accuracy, and optimization class similarity of the built ML models, and select certain ML models (714), e.g., that ML model analyzer 410 assesses to be the best models for optimization processing by optimization model generator and solver 418. ML model analyzer 410 may select one or more of the trained machine learning predictive models based at least in part on one or more selection criteria, wherein generating the solved machine learning optimization model may be based at least in part on the selected one or more trained machine learning predictive models. The one or more selection criteria may include one or more of: machine learning accuracy, machine learning model complexity, machine learning model optimization class similarity, machine learning model feature importance, richness of machine learning model training data, and user model preferences.

Optimization model generator and solver 418 of optimized machine learning system 400 may formulate an optimization model (or more than one optimization model) from the input constraints, objectives, and embedded ML models (716). Optimization model generator and solver 418 may then solve the optimization model (718). Optimization model generator and solver 418 may solve multiple optimization models, such as in parallel, for DO pipelines. Formulating and solving the optimization model may also be considered to be performing an optimization process on the trained machine learning predictive models, and then solving and generating the solved machine learning optimization model. Performing the optimization process on the trained machine learning predictive models may include assessing the trained machine learning predictive models with reference to a plurality of coupled metrics. The coupled metrics may include machine learning accuracy, optimization solution quality, and speed of convergence to one or more control values, for example.

Solution quality checker and UI 420 may detect and attempt to verify the one or more optimization solutions, and detect a high or low solution quality (722). If solution quality checker and UI 420 can detect a high decision quality and can verify the one or more optimization solutions, solution quality checker and UI may output the one or more solved ML optimization models and/or solutions, and/or one or more quality metrics for one or more solutions of the one or more solved ML optimization models, as solution output 422 (724). Solution quality checker and UI 420 may optionally enable user interaction to analyze and manipulate potential optimization solutions (726) in this process.

If solution quality checker and UI 420 cannot verify or satisfy an optimal decision point, and instead detects a low decision quality, it may generate feedback signals calling for one or more new ML models, one or more new features in an ML model, and/or one or more new ML optimization models (728). Solution quality checker and UI 420 may provide feedback signals based on any one or more of a deviation from the historical data, or from the probability of the output, or from domain expert opinion, for example. In either case, optimized machine learning system 400 may repeat the entire process, to enable a continuous improvement feedback loop (730), in various examples.

Solution quality checker and UI 420 may thus attempt to verify the solved machine learning optimization model and/or detect a solution quality, including whether a solution quality is a high solution quality or a low solution quality, in various examples. Solution quality checker and UI 420 may, in response to detecting a low solution quality, and/or being unable to verify the solved machine learning optimization model, generate one or more feedback signals indicative of a call for one or more of: one or more new machine learning models and one or more new machine learning optimization models. Solution quality checker and UI 420 may, in response to detecting a high solution quality, and/or verifying the solved machine learning optimization model, output the solved machine learning optimization model.

In some examples, optimized machine learning system 400 may perform AutoDO to perform joint optimization over the choice of ML models, using data density and machine learning model accuracy as two metrics. In this architecture, AutoAI may build multiple model types for each process node: e.g., ReLU, MARS, LR, RF, DT, for translating into MILPs. For any given problem instance, AutoDO may sample (potentially exhaustively) several combinations of model types, and solve the optimization problem. For each combination, i, optimized machine learning system 400 may index the optimal solution as $x_i^*$. Optimized machine learning system 400 may computationally determine the historical data density, as well as machine learning model accuracy in the neighborhood of $x_i^*$. An AutoDO component of optimized machine learning system 400 may choose a combination that leads to the best machine learning model accuracy, with a sufficient threshold on data density, thereby jointly optimizing the choice of the regression model as well as desirable criteria for an induced optimal solution.

In some examples, optimized machine learning system 400 may perform steady state regression optimization on either a single node or multiple nodes. In a physical process system such as example physical process system 501 of FIG. 5, optimized machine learning system 400 may treat each plant and tank as a node of a graph, analyze how many controlled variables are inputs to each of the plants, and then an AutoAI component of optimized machine learning system 400 may build multiple ML models, with one or more ML models per each node of the graph, incorporating the number of controlled variables that are inputs to each of the plants in the graph. Optimized machine learning system 400 may ingest historical data on inputs and outputs in any suitable form (e.g., CSV files, JSON files) and, for each ML model, form a model description in which the output is treated as a response and the inputs are treated as covariates. For example, in the example of a tar sands energy processing physical system, optimized machine learning system 400 may record the output as an outflow rate of processed petroleum product, and the covariate inputs to each of one of the plants as raw material inflow rate, utility water inflow rate, mixing speed, active ingredient concentration, impurity concentration, and so forth. Optimized machine learning system 400 may record whether each of the inputs is controlled or uncontrolled, and analyze and record rates of change, lower bounds, upper bounds, and other characteristics based on the historical data, in the process of building and training the ML models, for example. Optimized machine learning system 400 may thus train a plurality of machine learning predictive models on historical data of a target physical process system. Optimized machine learning system 400 may embed various types of built ML models in an optimization model, such as including one or more of each of linear regression, multivariate adaptive regression spline (MARS) or open-source equivalents thereof, decision tree regression, neural network (MLP regressor), random forest regression models, and/or any other types of ML models, for example.

In various examples, a solution quality checker and UI 420 of an optimized machine learning system 400 as in FIG. 4 may include and implement an AutoDO experiment user interface. The AutoDO experiment user interface may include an interface element for adding data, in suitable forms such as CSV files; a UI element to select any applicable controlled or uncontrolled input variable to target; and UI elements to select types of experiments and to run experiments, such as an experiment to maximize decision optimization. The applicable input variables, in an ore mining and processing system example, may include input variables such as ore inflow rate, hot process water flow rate, agitator speed, utility hot process water temperature, ore concentration, and froth production rate. Optimized machine learning system 400 may build and train various types of ML models based on data entered via such a user interface, using ML models such as linear regression, MARS regression, neural network regression, and random forest regression, for example. Optimized machine learning system 400 may use such ML models based on user-entered data in an optimization comparison for a control function to be optimized, such as characteristics of ore processing pipelines to be constructed in an ore processing physical system, for example, and may compare and optimize characteristics for different potential ore processing pipelines to be constructed, from across potential designs generated by each ML model. For example, optimized machine learning system 400 may predict and optimize for any one or more of build time, outflow rate, and estimated mixing speed, among each candidate pipeline. Solution quality checker and UI 420 may depict UI elements showing performance for each ML model based candidate solution under each performance criterion, thereby surfacing rich analytical results in graphical form for human operators, enabling human operators to quickly analyze and comprehend the analytical and optimization results and make adjustments or selections thereto, in various examples FIG. 8 shows a flowchart of an exemplary method in accordance with aspects of the present disclosure. Steps of the method may be carried out by one or more processing devices in the architecture of any one or more of the examples of FIGS. 3, 4, and 6, and are described with reference to elements depicted in the examples of FIGS. 4, 5, and/or 6.

An optimized machine learning system of this disclosure, such as optimized machine learning systems 400, 500, and/or 600 of FIGS. 4, 5, and/or 6, may train a plurality of machine learning predictive models, thereby generating a plurality of trained machine learning predictive models (810), such as by the operation of automated machine learning generator 402 and/or machine learning prediction model module 620 as described with reference to FIGS. 4 and 6 and as otherwise described above. An optimized machine learning system of this disclosure may generate a solved machine learning optimization model, based at least in part on the plurality of trained machine learning predictive models (820), such as by operation of machine learning model analyzer 410 and/or optimization model generator and solver 418 and/or optimization module 630 as described with reference to FIGS. 4 and 6 and as otherwise described above. An optimized machine learning system of this disclosure may output one or more control inputs and predicted outputs based at least in part on the solved machine learning optimization model (830), such as by the output operations of machine learning model analyzer 410 and/or optimization model generator and solver 418 and/or optimization module 630, and by the operation of solution quality checker and UI 420, including by outputting solution output 422, and by operation of control management solutions module 640, as described with reference to FIGS. 4 and 6 and as otherwise described above. An optimized machine learning system of this disclosure, such as optimized machine learning systems 400, 500, and/or 600 of FIGS. 4, 5, and/or 6, may be configured to provide software as a service in a cloud environment, as described above, to perform any or all of the operations described herein.

Computer readable program instructions for carrying out operations of optimized machine learning systems 96, 400, 500, and/or 600, and/or other aspects of the present disclosure, may include assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as C++, Java, Smalltalk, or the like; procedural or imperative programming languages, such as C; specialized languages such as hardware description language (HDL); Lisp programming languages, such as Common Lisp, Racket, or Clojure; other functional programming languages, such as Haskell or Erlang; or multi-paradigm languages, such as Python or Rust. One or more processors may comprise a programmable central processing unit (CPU) configured for executing programmed instructions stored in one or more memory device(s). In another illustrative example, one or more processors may be implemented using one or more heterogeneous processor systems in which a main processor is present with secondary processors on a single chip. This may include a CPU and an FPGA on a single integrated circuit chip. In another illustrative example, one or more processors may be a symmetric multi-processor system containing multiple processors of the same type. One or more processors may be a reduced instruction set computing (RISC) microprocessor, an x86 compatible processor, or any other suitable processor. In various examples, one or more processors may include a multi-core processor, for example. One or more processors may include multiple processing chips on one die, and/or multiple dies on one package or substrate, for example. One or more processors may also include one or more levels of integrated cache memory, for example. In various examples, one or more processors may comprise one or more CPUs and/or other processing devices distributed across one or more locations, from adjacent devices, to distributed across any locations around the Earth or elsewhere in a cloud computing environment, or anything in between.

Program modules as described herein are not limited to constituting "modules" per se as that term may mean or have a specialized meaning in any particular programming language or framework or software engineering paradigm or context, but may comprise any kind of portion of software code or executable instructions executable by one or more processing devices. Each of the operating system, one or more application programs, other program modules, and program data or some combination thereof, as described herein, may include an implementation of a networking environment. The operating system may provide functions such as device interface management, memory management, and multiple task management. The operating system may be a Unix-based operating system, a non-Unix based computer operating system, a network operating system, a real-time operating system (RTOS), a robot operating system (ROS), or any other suitable operating system. One or more processors may be suitably programmed to read, load, and execute instructions of the operating system. Program modules as described herein may generally carry out the functions and/or methodologies of embodiments of the disclosure as described herein.

In various embodiments, a service provider may offer to perform the processes described herein. In this case, the service provider may create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the disclosure provides a computer-implemented method, via a network. In this case, a computer infrastructure, such as computer system/server 12 (FIG. 1), can be provided and one or more systems for performing the processes of the disclosure can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein is chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, from an interactive user interface, a set of selections of user interface elements associated with machine learning predictive models applicable to a physical process system;

training, by one or more processing devices, a plurality of machine learning predictive models based on the set of selections of user interface elements, thereby generating a plurality of trained machine learning predictive models;

generating, by the one or more processing devices, a solved machine learning optimization model, based at least in part on the plurality of trained machine learning predictive models;

detecting, by the one or more processing devices, a solution quality of the solved machine learning optimization model, wherein the solution quality is determined based at least in part on an optimization class similarity between the plurality of trained machine learning predictive models and an optimization solver type;

generating, by the one or more processing devices, a response to implement a continuous process improvement feedback loop of integrated optimized machine learning, based at least on the detected solution quality, wherein the response comprises a signal to select a different machine learning model type to improve the optimization class similarity;

outputting, by the one or more processing devices, one or more control inputs and predicted outputs based at least in part on the solved machine learning optimization model; and generating, based on the predicted outputs and to be outputted at the interactive user interface, a set of displayed recommendations enabling adding or modifying control signals to one or more components of the physical process system.

2. The method of claim 1, further comprising:

selecting one or more of the trained machine learning predictive models, based at least in part on one or more selection criteria, wherein generating the solved machine learning optimization model is based at least in part on the selected one or more trained machine learning predictive models.

3. The method of claim 2, wherein the one or more selection criteria comprise one or more selected from a group consisting of: machine learning accuracy, machine learning model complexity, machine learning model optimization class similarity, machine learning model feature importance, richness of machine learning model training data, and user model preferences.

4. The method of claim 1, wherein generating the solved machine learning optimization model comprises performing an optimization process on the trained machine learning predictive models.

5. The method of claim 4, wherein performing the optimization process on the trained machine learning predictive models comprises assessing the trained machine learning predictive models with reference to a plurality of coupled metrics.

6. The method of claim 5, wherein the coupled metrics comprise machine learning accuracy, optimization solution quality, and speed of convergence to one or more control values.

7. The method of claim 1, wherein the plurality of machine learning predictive models are trained on historical data of a target physical process system.

8. The method of claim 7, further comprising parsing domain knowledge, wherein the plurality of machine learning predictive models are also trained at least in part on the parsed domain knowledge.

9. The method of claim 1, further comprising parsing machine learning optimization input constraints, wherein generating the solved machine learning optimization model is further based at least in part on the parsed machine learning optimization input constraints.

10. The method of claim 1, wherein outputting the one or more control inputs and predicted outputs comprises outputting one or more control inputs selected from a group consisting of: realtime control inputs, near-realtime control inputs, online control inputs, short-term scheduling control inputs, long-term planning control inputs, and offline control inputs.

11. The method of claim 1, further comprising:

in response to detecting a low quality solution from the solved machine learning optimization model, generating one or more feedback signals indicative of a call for one or more selected from a group consisting of: one or more new machine learning models, one or more new features, and one or more new machine learning optimization models; and in response to detecting a high solution quality of the solved machine learning optimization model, outputting a quality metric for a solution of the solved machine learning optimization model.

12. The method of claim 1, wherein the one or more processing devices are configured to provide software as a service in a cloud environment, wherein the software as a service is configured to output the one or more control inputs and predicted outputs.

13. A computer program product comprising one or more computer-readable storage media having program instructions collectively stored on the one or more computer readable storage media, the program instructions executable by a computing system to:

receive, from an interactive user interface, a set of selections of user interface elements associated with machine learning predictive models applicable to a physical process system;

train a plurality of machine learning predictive models based on the set of selections of user interface elements, thereby generating a plurality of trained machine learning predictive models; generate a solved machine learning optimization model, based at least in part on the plurality of trained machine learning predictive models;

detect a solution quality of the solved machine learning optimization model, wherein the solution quality is determined based at least in part on an optimization class similarity between the plurality of trained machine learning predictive models and an optimization solver type;

generate a response to implement a continuous process improvement feedback loop of integrated optimized machine learning, based at least on the detected solution quality, wherein the response comprises a signal to select a different machine learning model type to improve the optimization class similarity;

output one or more control inputs and predicted outputs based at least in part on the solved machine learning optimization model; and generate, based on the predicted outputs and to be outputted at the interactive user interface, a set of displayed recommendations enabling adding or modifying control signals to one or more components of the physical process system.

14. The computer program product of claim 13, wherein the program instructions are further executable by the computing system to:

select one or more of the trained machine learning predictive models, based at least in part on one or more selection criteria, wherein generating the solved machine learning optimization model is based at least in part on the selected one or more trained machine learning predictive models, and wherein the one or more selection criteria comprise one or more selected from a group consisting of: machine learning accuracy, machine learning model complexity, machine learning model optimization class similarity, machine learning model feature importance, richness of machine learning model training data, and user model preferences.

15. The computer program product of claim 13, wherein generating the solved machine learning optimization model comprises performing an optimization process on the trained machine learning predictive models, wherein performing the optimization process on the trained machine learning predictive models comprises assessing the trained machine learning predictive models with reference to a plurality of coupled metrics, and wherein the coupled metrics comprise machine learning accuracy, optimization solution quality, and speed of convergence to one or more control values.

16. The computer program product of claim 13, wherein the program instructions are further executable by the computing system to:

in response to detecting a low quality solution from the solved machine learning optimization model, generate one or more feedback signals indicative of a call for one or more selected from a group consisting of: one or more new machine learning models, one or more new features, and one or more new machine learning optimization models; and in response to detecting a high solution quality of the solved machine learning optimization model, output a quality metric for a solution of the solved machine learning optimization model.

17. A system comprising:

one or more processors, one or more computer-readable memory devices, one or more computer-readable storage media, and program instructions collectively stored on the one or more computer-readable storage media, the program instructions executable by the one or more processors via the one or more computer-readable memory devices to:

receive, from an interactive user interface, a set of selections of user interface elements associated with machine learning predictive models applicable to a physical process system;

train a plurality of machine learning predictive models based on the set of selections of user interface elements, thereby generating a plurality of trained machine learning predictive models;

generate a solved machine learning optimization model, based at least in part on the plurality of trained machine learning predictive models;

detect a solution quality of the solved machine learning optimization model, wherein the solution quality is determined based at least in part on an optimization class similarity between the plurality of trained machine learning predictive models and an optimization solver type;

generate a response to implement a continuous process improvement feedback loop of integrated optimized machine learning, based at least on the detected solution quality, wherein the response comprises a signal to select a different machine learning model type to improve the optimization class similarity;

output one or more control inputs and predicted outputs based at least in part on the solved machine learning optimization model; and generate, based on the predicted outputs and to be outputted at the interactive user interface, a set of displayed recommendations enabling adding or modifying control signals to one or more components of the physical process system.

18. The system of claim 17, wherein the program instructions are further executable by the one or more processors to:

select one or more of the trained machine learning predictive models, based at least in part on one or more selection criteria, wherein generating the solved machine learning optimization model is based at least in part on the selected one or more trained machine learning predictive models, and wherein the one or more selection criteria comprise one or more selected from a group consisting of: machine learning accuracy, machine learning model complexity, machine learning model optimization class similarity, machine learning model feature importance, richness of machine learning model training data, and user model preferences.

19. The system of claim 17, wherein generating the solved machine learning optimization model comprises performing an optimization process on the trained machine learning predictive models, wherein performing the optimization process on the trained machine learning predictive models comprises assessing the trained machine learning predictive models with reference to a plurality of coupled metrics, and wherein the coupled metrics comprise machine learning accuracy, optimization solution quality, and speed of convergence to one or more control values.

20. The system of claim 17, wherein the program instructions are further executable by the one or more processors to:

in response to detecting a low quality solution from the solved machine learning optimization model, generate one or more feedback signals indicative of a call for one or more selected from a group consisting of: one or more new machine learning models, one or more new features, and one or more new machine learning optimization models; and in response to detecting a high solution quality of the solved machine learning optimization model, output a quality metric for a solution of the solved machine learning optimization model.

* * * * *